United States Patent
Kondo et al.

[11] 3,912,671
[45] Oct. 14, 1975

[54] FLAME-RETARDANT RESINOUS COMPOSITION

[75] Inventors: Renichi Kondo, Tokyo; Koji Nakagawa, Asahi; Makoto Fukuda, Sagamihara; Hiroshi Okai; Ikuji Kishi, both of Machida, all of Japan

[73] Assignee: Denki Kagaku Kogyo Kabushiki Kaisha, Tokyo, Japan

[22] Filed: May 23, 1974

[21] Appl. No.: 472,687

[52] U.S. Cl. ........ 260/23 XA; 106/15 FP; 106/306; 260/23 S; 260/23 H; 260/23.7 M; 260/42.37; 260/42.43; 260/42.46; 260/42.47; 260/42.49; 260/42.52; 260/42.57; 260/45.7 R; 260/752; 260/765

[51] Int. Cl.² ............................................ C08K 3/22
[58] Field of Search........... 260/42.13, 42.37, 42.43, 260/23 S, 23 XA, 23 H, 23.7 M, 42.46, 42.47, 42.49, 42.52, 42.57, 45.7 R, 752, 765; 106/306

[56] References Cited
UNITED STATES PATENTS

| | | | |
|---|---|---|---|
| 2,636,830 | 4/1953 | Woll | 106/306 |
| 3,256,229 | 6/1966 | Janota et al. | 260/42.13 |
| 3,825,519 | 7/1974 | Murayama et al. | 260/42.13 |

*Primary Examiner*—James H. Derrington
*Attorney, Agent, or Firm*—Cooper, Dunham, Clark, Griffin & Moran

[57] ABSTRACT

A resinous composition with excellent flame-retardancy and high-temperature moldability is produced by mixing a thermoplastic resin or a rubber and a calcium-aluminate type mineral having $3CaO \cdot Al_2O_3 \cdot 6H_2O$ as the principal component.

7 Claims, No Drawings

FLAME-RETARDANT RESINOUS COMPOSITION

BACKGROUND OF THE INVENTION

Previously known techniques for producing shaped articles from flame-retardant thermoplastic resins and rubbers have included one method whereby a thermoplastic resin is admixed with an organic halogen compound or an organic phosphorus compound and the resulting composition is thereafter molded and another method whereby a monomer having water dispersed therein in advance is cast in a mold and then polymerized.

The flame-retardant resinous compositions prepared by these methods, however, are not completely satisfactory in that, in the first method at high temperatures, the compositions are decomposed with liberation of noxious gases and, in the second method, the water evaporates from the shaped articles and consequently no longer functions to keep them in a flame-retardant state.

A method whereby a compound containing water of crystallization such as sulfate, phosphate or a similar salt of magnesium, calcium or aluminum is incorporated into a thermoplastic resin has also been proposed. However, since nearly all the water of crystallization in such inorganic salts is released and evaporated at about 100°C, no flame-retarding effect can be achieved if when the resin incorporating the salt is subjected to molding at a temperature in the range of 170° and 220°C, since partial dehydration of the salts takes place with the result that the shaped articles are foamed or have a rough surface.

Aluminum hydroxide is an inorganic compound which is dehydrated at a relatively high temperature. This dehydration begins to take place when the temperature increases to about 170°C. The disadvantage of aluminum hydroxide is that the number of shaping conditions, blending ratios and uses of products is inevitably limited.

SUMMARY OF THE INVENTION

The present invention provides a means for alleviating the difficulties described above. In accordance with the invention, thermoplastic or rubber compositions are provided which contain a calcium-aluminate type mineral having $3CaO.Al_2O_3.6H_2O$ as the principal component. The compositions are flame retardant and moldable.

To be specific, the present invention relates to a flame-retardant resinous composition which comprises 100 parts by weight of a thermoplastic resin or rubber and 50 to 300 parts by weight of a calcium-aluminate type mineral having $3CaO.Al_2O_3.6H_2O$ as the principal component.

DETAILED DESCRIPTION OF THE INVENTION

The calcium-aluminate type mineral having $3CaO.Al_2O_3.6H_2O$ as the principal component utilized in this invention has an isometric crystal system. The countertype synthesized as a suspension in water assumes an isometric form approximating a sphere. The mineral is a stable hydrate of calcium aluminate having 6 mols of firmly bonded water of crystallization. This water of crystallization begins to be released from the hydrate at temperatures of not less than 220°C. This means that the calcium-aluminate type mineral having $3CaO.Al_2O_3.6H_2O$ as the principal component withstands high temperature molding, and therefore may be employed with substantially all thermoplastic resins in the production of flame-retardant shaped articles. The spherical shape of the calcium-aluminate type mineral used in the invention is advantageous since even when the mineral is incorporated in large quantities the resulting molding composition manifests good molding properties.

The calcium-aluminate type mineral having $3CaO.Al_2O_3.6H_2O$ as the principal component can be produced, for example, by mixing a lime compound and an oxide or hydroxide of aluminum as starting materials in stoichiometric amounts, burning the mixture at 1350° to 1500°C for five to six hours and hydrating the resultant burnt product or by placing oxides or hydroxides of calcium and aluminum in stoichiometric amounts in water and allowing them to react with each other at normal room temperature or preferably at an elevated temperature of not less than 80°C for five hours or more. Alternatively, it can be obtained by allowing $CaO.Al_2O_3$, $12CaO.7Al_2O_3$, or some other calcium-aluminate compound or a hydration product thereof prepared in advance to react in water with an oxide or hydroxide of calcium or aluminum, similarly to the manner described above, at normal room temperature or preferably at an elevated temperature of not less than 80°C for five hours or more.

Even if the calcium-aluminate type mineral having $3CaO.Al_2O_3.6H_2O$ as the principal component produced contains a small amount of unchanged oxide or hydroxide of calcium or aluminum, there is no adverse effect on the flame-retardancy or any other physical property of the shaped articles so long as the oxide or hydroxide content is within the limit of about 5% by weight.

From the standpoints of ease of blending, moldability and flame-retarding efficiency, the calcium-aluminate type mineral having $3CaO.Al_2O_3.6H_2O$ as the principal component is selected to have a particle size range so that the average particle diameter is from 1 $\mu$ and 200 $\mu$, preferably 1 $\mu$ and 100 $\mu$. The term "average particle diameter" as used herein is determined by the centrifugal light transmitting method. The size distribution of particles is not critical. When the calcium-aluminate type mineral having $3CaO.Al_2O_3.6H_2O$ as the principal component incorporated in a resinous composition of the invention has an average particle diameter of less than 1 $\mu$, it tends to have increased melt viscosity and decreased moldability in injection molding and extrusion molding operations. When it has an average particle diameter exceeding 200 $\mu$, the resulting products have a rough surface and are deficient in flame-retardancy.

Examples of the thermoplastic resins and of the rubbers which are usable for the present invention include polyolefins such as polyethylene and polypropylene; olefinic copolymers such as ethylene-propylene and ethylene-vinyl acetate copolymers; polystyrene; styrene containing copolymers such as acrylonitrile-styrene copolymers; methyl methacrylate-styrene copolymers and acrylonitrile-styrene-butadiene terpolymers; polyvinyl chloride; vinyl chloride-based copolymers such as vinyl chloride-propylene copolymers, vinyl chloride-vinylidene chloride copolymers and vinyl chloride-vinyl acetate copolymers; natural rubbers, styrene-butadiene rubber, polybutadiene and polyisoprene.

The thermoplastic resin and the calcium-aluminate type mineral having $3CaO\cdot Al_2O_3\cdot 6H_2O$ as the principal component are intimately mixed at temperatures between the softening point of the thermoplastic resin and 220°C by means of an extruder, a roll mill or a Banbury mixer and molded in the shape of chips, pellets or a sheet. The molded resinous composition is further processed, as required, by injection molding, extrusion molding, compression molding or foam molding to afford a molded product of a desired shape. When desired, a stabilizer, an antistatic agent, a coloring agent, a slidant, a plasticizer, a vulcanizer, a vulcanization accelerator, a process oil, etc. may be added to the resinous composition during the blending. The resinous composition may also contain a filler as calcium carbonate, magnesium carbonate, gypsum, silica glass or carbon black and a reinforcing material such as glass fiber, metal fiber or carbonaceous fiber. It is likewise possible to utilize a foaming agent and mold the resulting mixture to produce foamed products.

In mixing the thermoplastic resin or rubber and the calcium-aluminate type mineral having $3CaO\cdot Al_2O_3\cdot 6H_2O$ as the principal component, the desired ratio is 100 parts by weight of the thermoplastic resin or rubber to 50 to 300 parts, preferably 50 to 200 parts, by weight of the calcium-aluminate type mineral having $3CaO\cdot Al_2O_3\cdot 6H_2O$ as the principal component based on the weight of resin or rubber. Since the calcium-aluminate type mineral having $3CaO\cdot Al_2O_3\cdot 6H_2O$ as the principal component is formed of crystals each having an outer shape resembling a sphere, it can be incorporated into the resin in a far greater amount than any other filling agent. If the amount of $3CaO\cdot Al_2O_3\cdot 6H_2O$ incorporated is not more than 50 parts by weight, then the resultant resinous composition does not have the desired flame-retarding property. If is exceeds 300 parts by weight, then the resinous composition manifests insufficient moldability.

According to a further aspect of this invention, when the surface of the calcium-aluminate type mineral having $3CaO\cdot Al_2O_3\cdot 6H_2O$ as the principal component is coated with a small portion of a surface active agent, the resin is easily mixed and the filler is sufficiently dispersed. There appears to be improved adaptation between the resin layer and the surface of the calcium-aluminate type mineral. Consequently, the mechanical properties of flame-retardant resinous compositions, such as a tensile strength and so on, are improved compared to compositions with no surface active agent. Typical agents employed as surface active agents in this invention include fatty acids such as stearic acid and oleic acid, or metal salt thereof, esters such as polyethyleneglycols and other alkyl naphthalenesulfonate and aliphatic amine salts. The amount of the surface active agent employed for each 100 parts by weight of the calcium-aluminate type minerals is preferably 5 to 10 parts by weight.

The present invention, as described above, provides flame-retardant resinous compositions which comprise a thermoplastic resin or a rubber and a and the calcium-aluminate type mineral having $3CaO\cdot Al_2O_3\cdot 6H_2O$ as the principal component. A particular advantage of the composition that the flame-retarding effect is retained over a prolonged period of storage and the shaped article produced has improved bending and tensile modulus, vicat softening point, surface hardness, and dimensional stability with lapse of time. Thus, the present invention permits production of shaped articles which a thick and heavy and exhibit a beautiful milk-white color.

Shaped articles made of the flame-retardant resinous compositions of this invention find utility in building materials, interior materials, furniture, automobile interior materials, electrical appliance parts, etc.

Preferred embodiments of the present invention will be cited herein below.

The calcium-aluminate type mineral having $3CaO\cdot Al_2O_3\cdot 6H_2O$ as the principal component which was used in the preferred embodiments was prepared by the following procedure:

To a flask containing 3 liters of distilled water, 3 mols of $Ca(OH)_2$ were added. The resulting suspension was heated to 95°C and 2 mols of $Al(OH)_3$ were added portionwise with agitation. The reaction allowed to continue for four hours with continuous agitation. At the end of the reaction, the precipitate which formed was separated by filtration, washed with distilled water and dried in a draft of hot air at 100°C. A sample of the product was assayed by the powder X-ray diffraction method using an X-ray diffraction apparatus (made by Rigaku Denki Co., Ltd.) under the conditions of Cu K$\alpha$ rays, 30 KV of potential and 2°/min. of scanning speed. Diffraction peaks typical of a calcium-aluminate type mineral having $3CaO\cdot Al_2O_3\cdot 6H_2O$ as the principal component alone (main peaks $2\theta = 31.8°, 39.2°$ and $44.4°$) were observed. When the sample was placed on a thermobalance ("Thermoflex" made by Rigaku Denki Co., Ltd.) and heated from normal room temperature to 480°C at a temperature increase rate of 5°C/min, the weight loss which was observed between 250 and 300°C was found to be 28.4%, a value identical with the theoretical water content of the calcium-aluminate type mineral having $3CaO\cdot Al_2O_3\cdot 6H_2O$ as the principal component.

By the centrifugal light transmitting method, the sample was found to have an average particle diameter of 6 $\mu$.

In all the preferred embodiments to be cited herein below, the calcium-aluminate type mineral having $3CaO\cdot Al_2O_3\cdot 6H_2O$ as the principal component (hereinafter referred to as $C_3AH_6$) prepared by this procedure was used.

EXAMPLE 1

A mixture consisting of polystyrene ("Denka Polystyrene QP-3" produced by the Electro Chemical Industrial Co., Ltd.) and $C_3AH_6$ having an average particle diameter of 6 $\mu$ in different proportions shown in Table 1 was blended for 15 minutes in a roll mill formed of a pair of 6-inch press rolls and having the roll surface held at 140°C, then rolled out through the roll mill and cooled to produce a sheet-shaped mold. The sheet-shaped mold was comminuted by a Horai type pulverizing machine to produce amorphous chips about 2 to 5 mm in diameter and injection molded at 200°C cylinder temperature, 1150 kg/cm$^2$ injection pressure and 40°C die temperature to produce various test pieces. The test pieces for Runs No. 3 and 4 had linear expansion coefficients of $1.5 \times 10^{-5}$/°C to $2.5 \times 10^{-5}$/°C and shrinking ratios of 0.05 to 0.2% at the time of molding.

Table 1

| Run No. | Polystyrene (parts by weight) | $C_3AH_6$ (parts by weight) | Bending strength (kg/mm$^2$) | Bending modulus (kg/mm$^2$) | Vicat softening point (°C) | MFI (g/10 min.) | Combustion property |
|---|---|---|---|---|---|---|---|
| 1 | 100 | 0 | 10.3 | $4.0 \times 10^2$ | 96 | 30.5 | Flammable |
| 2 | 100 | 30 | 9.6 | $5.4 \times 10^2$ | 97 | 21.0 | Flammable |
| 3 | 100 | 50 | 8.2 | $6.1 \times 10^2$ | 99 | 11.0 | Self-extinguishing |
| 4 | 100 | 200 | 4.1 | $1.14 \times 10^3$ | 100 | 6.4 | Nonflammable |
| 5 | 100 | 350 | Incapable of injection molding | | — | — | — |

COMPARATIVE EXAMPLE 1

A mixture consisting of an inorganic filler in place of $C_3AH_6$ and a polystyrene at the different ratios indicated in Table 2 was processed following the procedure of Example 1.

From Table 2, the test pieces obtained in this case are seen to have lower MFI values for the same filler contents and lower moldability than those of Example 1 using $C_3AH_6$. By visual observation, the samples of Runs No. 5 and 6 were found to have irregularities on their surface and lack surface smoothness.

Table 2

| Run No. | Polystyrene (parts by weight) | Filler | (parts by weight) | Average particle diameter ($\mu$) | MFI (g/10 min.) | Combustion property |
|---|---|---|---|---|---|---|
| 5 | 100 | Al(OH)$_3$ | 50 | 6.9 | 7.3 | Self-extinguishing |
| 6 | 100 | Al(OH)$_3$ | 200 | 6.9 | 3.2 | Nonflammable |
| 7 | 100 | CaCO$_3$ | 50 | 6.5 | 3.3 | Flammable |
| 8 | 100 | CaCO$_3$ | 200 | 6.5 | 0.4 | Flammable |

EXAMPLE 2

A mixture consisting of a high-density polyethylene ("Hizex 1200J" produced by Mitsui Petrochemical Industry Co., Ltd.) and $C_3AH_6$ having an average particle diameter of 6 $\mu$ at the different proportions shown in Table 3 was blended in a roll mill formed of two 6-inch press rolls and having the roll surface kept at 150°C and then rolled out through the roll mill to produce a sheet-shaped mold. The sheet-shaped mold was cooled and thereafter cut with a cutter into chips and compressed with a hot press at 180°C temperature and 50 kg/cm$^2$ pressure for five minutes to produce various test pieces conforming to the relevant specifications.

Table 3

| Run No. | Polyethylene (parts by weight) | $C_3AH_6$ (parts by weight) | Tensile strength (kg/mm$^2$) | Tensile modulus (kg/mm$^2$) | Combustion property |
|---|---|---|---|---|---|
| 9 | 100 | 0 | 1.9 | $0.51 \times 10^2$ | Flammable |
| 10 | 100 | 30 | 1.8 | $0.66 \times 10^2$ | Flammable |
| 11 | 100 | 50 | 1.6 | $0.83 \times 10^2$ | Self-extinguishing |
| 12 | 100 | 100 | 1.3 | $1.14 \times 10^2$ | Nonflammable |
| 13 | 100 | 250 | 1.4 | $1.60 \times 10^2$ | Nonflammable |

The sample of Run No. 13 was obtained by pretreating the surface of $C_3AH_6$ using 7 parts by weight of stearic acid and 100 parts by weight of $C_3AH_6$ and mixing at high-speed in a Henschel mixer, at a temperature of 80°C.

EXAMPLE 3

A mixture consisting of 100 parts by weight of a polyvinyl chloride ("Denka Vinyl SS-110" made by the Electro Chemical Industrial Co., Ltd.) 5 parts by weight of a stabilizer (dibutyl tin maleate), 1 part by weight of a lubricant (butyl stearate) and a different number of parts, indicated in Table 4, of $C_3AH_6$ having an average particle diameter of 60 $\mu$ was blended in a roll mill formed of two 6-inch press rolls having a roll surface kept at 160°C, and then rolled out through the roll mill to produce a sheet-shaped mold. The sheet-shaped mold was cooled, crushed into flakes and compressed with a hot press at 170°C temperature and 50 kg/cm$^2$ pressure for ten minutes to produce various test pieces conforming to the relevant specifications.

Table 4

| Run No. | Polyvinyl chloride compound (parts by weight) | $C_3AH_6$ (parts by weight) | Tensile strength (kg/mm$^2$) | Tensile modulus (kg/mm$^2$) | Izod impact strength (kg-cm/cm$^2$) | Combustion property |
|---|---|---|---|---|---|---|
| 14 | 106 | 0 | 5.2 | $3.8 \times 10^2$ | 4.5 | Nonflammable |
| 15 | 106 | 50 | 4.6 | $5.6 \times 10^2$ | 3.4 | Nonflammable |
| 16 | 106 | 100 | 3.3 | $7.9 \times 10^2$ | 2.6 | Nonflammable |

Table 4—Continued

| Run No. | Polyvinyl chloride compound (parts by weight) | $C_3AH_6$ (parts by weight) | Tensile strength (kg/mm$^2$) | Tensile modulus (kg/mm$^2$) | Izod impact strength (kg-cm/cm$^2$) | Combustion property |
| --- | --- | --- | --- | --- | --- | --- |
| 17 | 106 | 200 | 2.1 | 1.05×10$^3$ | 1.8 | Nonflammable |

EXAMPLE 4

A styrene-butadiene rubber ("JSR-1500" made by Nippon Synthetic Rubber Co., Ltd.) was rolled in a roll mill formed of two 6-inch rolls and having the roll surface kept at 40°C and a vulcanization accelerator (CZ), an age resistor (SP), sulfur and a process oil were added thereto in the amounts indicated for each run in Table 5 and blended. Subsequently, $C_3AH_6$ or calcium carbonate was similarly added in an indicated amount and thoroughly blended. The blended rubber compound thus produced was filled into a metal die and vulcanized with a hot press at 145°C temperature and 50 kg/cm$^2$ pressure for 30 minutes to produce test pieces.

Table 5

| Run No. | SBR (parts by weight) | $C_3AH_6$ (parts by weight) | Calcium carbonate (parts by weight) | Age resistor, SP (parts by weight) | Sulfur (parts by weight) |
| --- | --- | --- | --- | --- | --- |
| 18 | 100 | 0 | 100 | 1 | 2 |
| 19 | 100 | 50 | 0 | 1 | 2 |
| 20 | 100 | 100 | 0 | 1 | 2 |
| 21 | 100 | 150 | 0 | 1 | 2 |

| Vulcanization accelerator (parts by weight) | Process oil (parts by weight) | Combustion property |
| --- | --- | --- |
| 1 | 5 | Flammable |
| 1 | 5 | Self-extinguishing |
| 1 | 5 | Nonflammable |
| 1 | 5 | Nonflammable |

EXAMPLE 5

In place of $C_3AH_6$ used in Example 1, $C_3AH_6$ having the different average particle diameters indicated in Table 6 was used. A mixture consisting of such $C_3AH_6$ and a polystyrene in the different proportions indicated in Table 6 was processed repeating the procedure of Example 1.

Table 6

| Run No. | Polystyrene (parts by weight) | $C_3AH_6$ Amount (parts by weight) | $C_3AH_6$ Average particle diameter ($\mu$) | MFI (g/10 min.) | Combustion property |
| --- | --- | --- | --- | --- | --- |
| 22 | 100 | 200 | 0.4 | 0.3 | Nonflammable |
| 23 | 100 | 200 | 6 | 6.4 | Nonflammable |
| 24 | 100 | 200 | 80 | 8.2 | Nonflammable |
| 25 | 100 | 200 | 170 | 10.4 | Self-extinguishing |
| 26 | 100 | 200 | 250 | 12.8 | Flammable |

The sample of Run No. 22 is seen from the table to have a very small MFI value and inferior fluidity while in the molten state. During the injection molding, it frequently caused short shot, suggesting very inferior moldability.

The sample of Run No. 26 which contained as much as 200 parts of $C_3AH_6$ was found to be flammable, indicating that the use of $C_3AH_6$ of too large an average particle diameter fails to accomplish the object of conferring the desired flame-retardancy.

EXAMPLE 6

A mixture consisting of an ethylene-vinyl acetate copolymer (containing 25% by weight of vinyl acetate) ("Everflex No. 360" made by Mitsui Petrochemical Industry Co., Ltd.), $C_3AH_6$ having an average particle diameter of 60 $\mu$ and azodicarboamide in the foaming agent at a different proportions indicated in Table 7 was blended in a roll mill formed of two 6-inch press rolls and having a surface temperature kept at 100°C, rolled out through the roll mill and cooled to produce a sheet-shaped mold. The sheet-shaped mold was cut into small pieces measuring about 2 to 5 mm. A metal die was packed with the small pieces so that the die interior had an unfilled space totalling about 40% of its volume and placed in a hot press at 200°C under substantially normal pressure, with the upper lid of the metal die kept oriented so that the gas generated in the course of foaming could escape through the opening between the lid and the die. Thus were produced test pieces conforming to the relevant specifications. With all the samples involved, the foaming ratio was invariably about 165%. The foamed products had very fine uniformly distributed cells throughout and exhibited elasticity.

Table 7

| Run No. | Ethylene-vinyl acetate copolymer (parts by weight) | $C_3AH_6$ (parts by weight) | Foaming agent (parts by weight) | Combustion property |
| --- | --- | --- | --- | --- |
| 26 | 100 | 0 | 5 | Flammable |
| 27 | 100 | 200 | 5 | Nonflammable |
| 28 | 100 | 300 | 5 | Nonflammable |

The methods of test and methods of determination as involved in the preceding preferred embodiments of this invention were as shown below.

1. Test for combustion property: This test was carried out by the method specified in ASTM D-635-68. Samples rated as self-extinguishing and nonflammable were accepted as flame-retardant.

2. Test for bending strength: This test was carried out by the method specified in ISO R-175.

3. Test for vicat softening point: This test was carried out by the method specified in ASTM D-1525.

4. Test for MFI: This test was carried out by the method specified in ASTM D-1238-65T.

5. Method for determination of average particle diameter: This determination was made by the centrifugal light transmitting methd. This method consisted of uniformly dispersing a given sample to a concentration of 0.05% (by weight) in a distilled water, placing the resulting dispersion in a glass cell having an inner volume of 25 cc and measuring $100 \times 20 \times 15$ mm, causing the time-course change of light transmitting coefficient at a point of a depth from the liquid level of the glass cell fixed by the approximate particle size of the sample to be automatically recorded for thereby obtaining a chart of a curve representing the cumulative area distribution and converting this curve through a proper calculation into a curve of cumulative weight destribution. During the determination of the light penetration coefficient, the time required for the determination could be shortened by subjecting the sample liquid to centrifugation. The particle diameter which corresponded to the point at which the cumulative weight percentage was 50 in the curve of the cumulative weight distribution was taken as the weight average particle diameter.

6. Test for tensile strength: This test was carried out by the method specified in ASTM D-638.

7. Test for tensile modulus: This test was carried out for the initial tangent tensile modulus covered by the method for tensile strength test specified in ASTM-638.

8. Test for Izod impact strength: This test was carried out by the method specified in ASTM D-256.

9. Method for determination of linear expansion coefficient: The thermal expansion coefficient was determined by heating a test piece 120 mm in length prepared for evaluation of bending strength on a (Kawashima type) linear expansion coefficient tester from normal room temperature to 70°C at a temperature increase rate of 1°C/min., finding the magnitude of linear expansion at the end of the heating and dividing this magnitude by the product of the original length of the test piece multiplied by the temperature difference.

10. Method for determination of shrinking coefficient during molding: The shrinking coefficient was determined by extruding a test piece prepared for bending strength evaluation through an injection molding die, measuring the inside dimension of the extruded piece in the direction of the length of the die, measuring the longitudinal dimension of the extruded piece after cooling, finding the difference between the two lengths, dividing the difference by the inside length of the die and expressing the answer in percentage.

Dimensions of test piece:

1. Test piece for tensile strength (ASTM D-638): 3 mm in thickness. The dimensions specified for samples, Type III, having thicknesses up to ¼ inch were adopted.

2. Test piece for bending strength (ISO R-175): 4 mm in thickness, 120 mm in length and 10 mm in width 3. Test piece for Izod impact (ASTM D-256): The dimensions specified for test pieces of Method B were adopted.

4. Test piece for vicat softening point (ASTM D-1525): 4 mm in thickness, 20 mm in length and 10 mm in width 5. Test piece for combustion property (ASTM D-635): 127 mm in length, 12.7 mm in width and 12.7 mm in thickness

What is claimed is:

1. A flame-retardant composition, comprising 100 parts by weight of a thermoplastic resin or rubber and 50 to 300 parts by weight of a calcium aluminate type mineral having an average particle diameter in the range of from 1 to 200 $\mu$ and containing $3CaO \cdot Al_2O_3 \cdot 6H_2O$ as the principal component, the said thermoplastic resin or rubber being selected from group consisting of:

Polystyrene,
Acrylonitrile-styrene copolymer,
Methyl methacrylate-styrene copolymer,
Acrylonitrile-styrene-butadiene copolymer,
Polyvinyl chloride,
Vinyl chloride-propylene copolymer,
Vinyl chloride-vinylacetate copolymer,
Vinyl chloride-vinylidene chloride copolymer,
Polyethylene,
Polypropylene,
Ethylene-propylene copolymer,
Ethylene-vinylacetate copolymer,
Natural rubber,
Styrene-butadiene rubber,
Polybutadiene rubber, and
Polyisoprene rubber.

2. The flame-retardant composition of claim 1, wherein the calcium-aluminate type mineral having $3CaO \cdot Al_2O_3 \cdot 6H_2O$ as the principal component has an average particle diameter in the range of 1 to 100 $\mu$.

3. The flame-retardant composition of claim 1, wherein the calcium-aluminate type mineral having $3CaO \cdot Al_2O_3 \cdot 6H_2O$ as the principal component is coated with a surface active agent by mixing 100 parts by weight of the calcium-aluminate type mineral having $3CaO \cdot Al_2O_3 \cdot 6H_2O$ as the principal component and 5 to 10 parts by weight of the surface active agent.

4. The flame-retardant composition of claim 1, wherein the thermoplastic resin is polystyrene.

5. The flame-retardant composition of claim 1, wherein the thermoplastic resin is polyvinyl chloride.

6. The flame-retardant composition of claim 1, wherein the rubber is natural rubber, polybutadiene, a styrene-butadiene copolymer or polyisoprene.

7. The flame-retardant composition of claim 1, wherein the thermoplastic resin or rubber and $3CaO \cdot Al_2O_3 \cdot 6H_2O$ are intimately mixed at a temperature between the softening point of the resin and 220°C.

* * * * *